(12) United States Patent
Thiery

(10) Patent No.: US 11,299,418 B2
(45) Date of Patent: Apr. 12, 2022

(54) UNFIRED HEAT AND/OR SOUND INSULATION PRODUCT AND INSULATION BLANKET OBTAINED THEREFROM

(71) Applicant: SAINT-GOBAIN ISOVER, Courbevoie (FR)

(72) Inventor: Julien Thiery, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 73 days.

(21) Appl. No.: 16/316,700

(22) PCT Filed: Jul. 19, 2017

(86) PCT No.: PCT/FR2017/051963
§ 371 (c)(1),
(2) Date: Jan. 10, 2019

(87) PCT Pub. No.: WO2018/015657
PCT Pub. Date: Jan. 25, 2018

(65) Prior Publication Data
US 2019/0185366 A1 Jun. 20, 2019

(30) Foreign Application Priority Data

Jul. 22, 2016 (FR) .................................. 1657002

(51) Int. Cl.
*C03B 37/04* (2006.01)
*D04H 1/4218* (2012.01)
(Continued)

(52) U.S. Cl.
CPC ................ *C03B 37/04* (2013.01); *B32B 5/02* (2013.01); *B32B 5/022* (2013.01); *B32B 5/024* (2013.01);
(Continued)

(58) Field of Classification Search
CPC ........... C03B 37/04; B32B 17/04; B32B 5/02; B32B 5/022; B32B 5/024; B32B 5/06;
(Continued)

(56) References Cited

U.S. PATENT DOCUMENTS

2004/0088938 A1 5/2004 Andersson et al.
2010/0000170 A1* 1/2010 Parks ...................... B32B 5/024
52/411
2011/0123760 A1 5/2011 Letourmy et al.

FOREIGN PATENT DOCUMENTS

EP          1 418 292 A1    5/2004
WO   WO 2009/112784 A1    9/2009

OTHER PUBLICATIONS

E. Archer, A. McIlhagger, "Repair of damaged aerospace composite structures" from Polymer Composites in the Aerospace Industry, 2015, Woodhead Publishing, pp. 393-412, https://doi.org/10.1016/B978-0-85709-523-7.00014-1 (Year: 2015).*
(Continued)

*Primary Examiner* — Brian Handville
(74) *Attorney, Agent, or Firm* — Pillsbury Winthrop Shaw Pittman LLP

(57) ABSTRACT

The invention relates to an uncured thermal and/or sound insulation product, based on mineral wool, advantageously on glass wool, that is in the form of a ply comprising a mineral wool layer sized by at least one binder, said sized layer having:
  a surface density, or basis weight, of less than or equal to 350 g/m$^2$, preferably less than or equal to 300 g/m$^2$, or less than or equal to 250 g/m$^2$, and, optionally, greater than or equal to 200 g/m$^2$,
  a micronaire of at most 3 under 5 grams, preferably of at most 15 l/min, better still of at most 12 l/min, and of at least 9 l/min, and the ply having a thickness of greater
(Continued)

than 10 mm, or greater than or equal to 15 mm, or even greater than or equal to 25 mm.

The invention makes it possible to propose a thermal and/or sound insulation product that is lighter while retaining satisfactory thermal and/or sound insulation properties and a good mechanical strength.

22 Claims, 1 Drawing Sheet

(51) Int. Cl.
*E04B 1/88* (2006.01)
*B32B 17/04* (2006.01)
*D04H 1/58* (2012.01)
*D04H 1/4209* (2012.01)
*B32B 5/02* (2006.01)
*B32B 5/06* (2006.01)
*B32B 5/26* (2006.01)
*B60R 13/08* (2006.01)
*C03C 25/34* (2006.01)
*C03C 25/36* (2006.01)
*D04H 1/587* (2012.01)
*G10K 11/162* (2006.01)

(52) U.S. Cl.
CPC ............... *B32B 5/06* (2013.01); *B32B 5/26* (2013.01); *B32B 17/04* (2013.01); *B60R 13/0815* (2013.01); *C03C 25/34* (2013.01); *C03C 25/36* (2013.01); *D04H 1/4209* (2013.01); *D04H 1/4218* (2013.01); *D04H 1/58* (2013.01); *D04H 1/587* (2013.01); *E04B 1/88* (2013.01); *G10K 11/162* (2013.01); *B32B 2262/02* (2013.01); *B32B 2262/101* (2013.01); *B32B 2262/106* (2013.01); *B32B 2307/102* (2013.01); *B32B 2307/304* (2013.01); *B32B 2307/3065* (2013.01); *B32B 2307/718* (2013.01); *B32B 2307/7145* (2013.01); *B32B 2307/73* (2013.01); *B32B 2307/732* (2013.01); *C03C 2217/76* (2013.01); *D10B 2401/04* (2013.01); *E04B 2103/04* (2013.01)

(58) Field of Classification Search
CPC . B32B 5/26; B32B 2262/02; B32B 2262/106; B32B 2307/3065; B32B 2307/7145; B32B 2307/718; B32B 2307/73; B32B 2307/732; B32B 2262/101; B32B 2307/102; B32B 2307/304; B32B 2255/26; B32B 2581/00; B32B 2262/0276; B32B 2262/0253; B32B 2260/021; B32B 2260/046; B32B 2255/02; B32B 19/02; B32B 19/06; D04H 1/58; D04H 1/4209; D04H 1/587; D04H 1/4218; B60R 13/0815; C03C 25/34; C03C 25/36; C03C 2217/76; G10K 11/162; E04B 1/88; E04B 2103/04; D10B 2401/04
See application file for complete search history.

(56) References Cited

OTHER PUBLICATIONS

International Search Report dated Oct. 2, 2017 in PCT/FR2017/051963 filed Jul. 19, 2017.

* cited by examiner

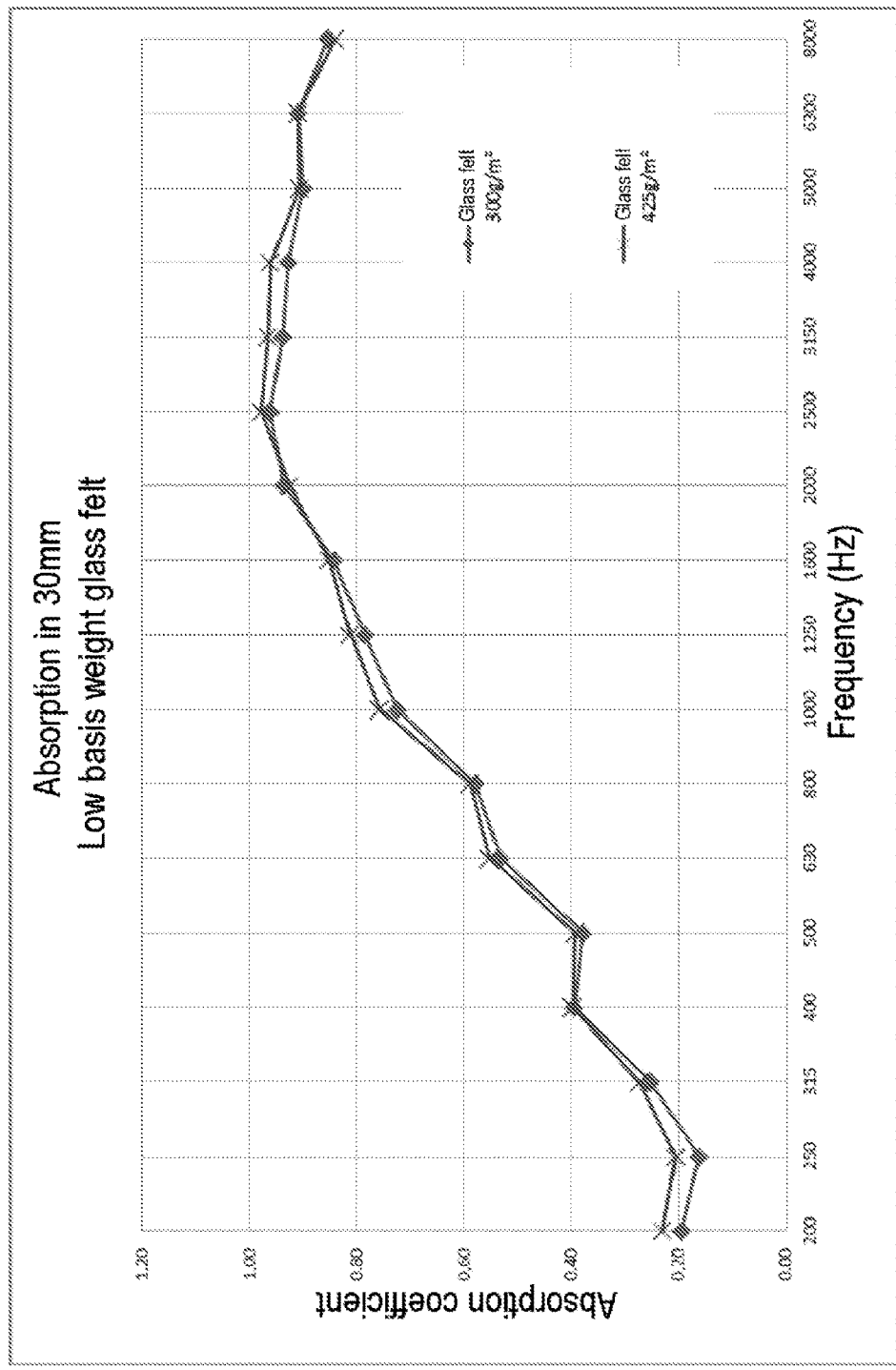

UNFIRED HEAT AND/OR SOUND INSULATION PRODUCT AND INSULATION BLANKET OBTAINED THEREFROM

The invention relates to a thermal and/or sound insulation product, based on mineral wool, such as on glass wool, intended to be used in particular for the manufacture of linings for insulation. These linings enable the sound and/or thermal insulation of the engine, or else of the passenger compartment, of a vehicle. The invention also relates to the process for manufacturing such a product and also to the process for manufacturing such a lining.

Sound insulators are known that are produced from foam type materials, such as polyurethane or melamine foams that attenuate the sound through viscous losses. However, these foams, derived from petroleum products, prove to be rather environmentally unfriendly and highly toxic in the event of fire. Specifically, they emit volatile organic compounds commonly referred to as VOCs. Moreover, the self-supporting nature thereof is unsatisfactory due to their poor rigidity.

Currently, there is a range of products sold by Saint-Gobain Isover® under the name "Glass Wool Automotive Green Mat" which is in the form of a glass wool layer or ply impregnated by a thermosetting binder of phenol-formaldehyde resin type that can be thermoset at around 200° C., having a basis weight between 400 and 1800 g/m², in particular of 425 g/m². This glass wool layer or ply is coated with polyester or polypropylene, and is treated against fire or to resist water and oil. This type of uncured product is used to manufacture insulating linings of vehicles, which are molded by thermocompression.

Also known, from document FR1429543, is a motor vehicle internal roof lining comprising a molded element, made from a ply of glass fibers, laid on a surface lining sheet.

The ply of glass fibers is produced in a forming line where the fibers formed are sprayed with binder of phenol-formaldehyde resin type, in a proportion of from 10% to 26% by weight relative to the weight of the final fibrous product. The fibers thus treated then fall randomly and are assembled in the form of a ply. The dimensions of the glass fibers produced may vary within broad limits and have a diameter of less than 0.009 mm. A blank having a thickness of 50 mm and with a density of 16 g/dm³ (i.e. 800 g/m²) is cut from a ply of glass fibers containing uncured binder, and placed in a mold to be compressed in order to obtain a thickness of 6.4 mm after curing. Blank densities are disclosed that range from 8 to 32 g/dm³ (i.e. between 400 and 1600 g/m²), or more.

However, these products are heavy, whereas the motor vehicle industry makes it necessary to reduce the weight of the vehicles even more in order to reduce fuel consumptions.

There is therefore a need for a thermal and/or sound insulation product that is lighter while retaining satisfactory thermal and/or sound insulation properties and a good mechanical strength.

For this, the invention proposes an uncured thermal and/or sound insulation product, based on mineral wool, advantageously on glass wool, comprising a mineral wool layer sized by at least one binder, said sized layer having:
- a surface density, or basis weight, of less than or equal to 350 g/m², preferably less than or equal to 300 g/m², or less than or equal to 250 g/m², and, optionally, greater than or equal to 200 g/m²,
- a micronaire of at most 3 under 5 grams, preferably of at most 15 l/min, better still of at most 12 l/min, and of at least 9 l/min. The micronaire "under 5 grams" is measured according to the DIN 53941 or ASTM D144 standard. For very fine fibers, the micronaire in l/min is measured according to the process described in patent application WO 2003/098209, which amounted to adding a flow meter to the apparatus of the DIN 53941 standard.

Thus, the thermal and/or sound insulation product according to the invention is lighter than the known products, with a basis weight of less than or equal to 350 g/m², which makes it possible to limit the amount of material used, and also to limit the weight of the vehicle on which the product, converted into lining, will be installed. This product furthermore has surprisingly efficient thermal and/or sound properties, as will be seen below.

According to another distinctive feature, the product comprises between 8% and 14% by weight of binder, preferably between 9% and 13% by weight of binder, relative to the total weight of the mineral wool and binder mixture, and is chosen from thermosetting binders.

According to another distinctive feature, the binder is chosen from thermosetting binders based (i) on phenol-formaldehyde resin, (ii) on polyepoxides, or (iii) on carbohydrates.

According to another distinctive feature, the mineral wool fibers are laid on a hydrophobic and/or oleophobic, woven or nonwoven web.

According to another distinctive feature, the web has, in addition, flame retardant and/or fungicidal properties owing to a compound fixed to said web by impregnation, coating or heat setting.

According to another distinctive feature, the web is a polyester-based woven web or a needle-punched nonwoven web based (i) on polyester and/or viscose fibers, (ii) on polypropylene fibers, or (iii) on carbon fibers, or a polyester-reinforced glass web.

According to another distinctive feature, the product is a ply having a thickness of greater than or equal to 10 mm, or greater than or equal to 15 mm, or even greater than or equal to 25 mm and/or having a thickness recovery of greater than or equal to 10 mm, or greater than or equal to 15 mm, or even greater than or equal to 25 mm following packaging in a roll for at least 6 weeks.

The invention also relates to a lining obtained from a thermal and/or sound insulation product according to the invention by molding into a shape at a polymerization temperature of the binder, the optionally non-planar lining conforming to the contours of the support surface on which it is intended to be mounted.

According to another distinctive feature, the lining has a thermal conductivity of less than or equal to 40 mW/(m·K), preferably less than or equal to 38 mW/(m·K), and/or has:
- an air flow resistivity of greater than or equal to 28 000 N·s/m⁴ when said mineral wool layer has a thickness of greater than or equal to 10 mm, or
- an air flow resistivity of greater than or equal to 13 500 N·s/m⁴ when said mineral wool layer has a thickness of greater than or equal to 15 mm, or
- an air flow resistivity of greater than or equal to 8000 N·s/m⁴ when said mineral wool layer has a thickness of greater than or equal to 25 mm.

According to another distinctive feature, the lining has a sound absorption of greater than or equal to 0.8 between 1300 and 9000 Hz, advantageously between 1800 and 9000 Hz, measured according to the DA 49 1997 standard.

The invention also relates to a process for manufacturing an uncured thermal and/or sound insulation product, based on mineral wool, advantageously on glass wool, as described above, with the aid of a facility comprising an internal centrifugation device that comprises at least one spinner capable of rotating about an axis X, in particular a vertical axis, and the peripheral band of which is pierced by a plurality of orifices for delivering filaments of a molten material, a high-temperature gas attenuating means in the form of an annular burner that attenuates the filaments into fibers, and a receiving belt associated with suction means for receiving the fibers, consisting in regulating a combination of parameters which are at least:

the pressure of the burner, which is between 250 and 750 mm WC, preferably between 280 and 440 mm WC, the temperature of the burner, which is between 1350° C. to 1450° C., the daily fiber output per spinner orifice, which is at most 1 kg, the total output being at most 26 kg/day, and the product (P) of the run speed of the receiving belt and the width of said belt, which is between 38 and 90 $m^2$/min.

According to another distinctive feature, the rotational speed of the spinner is between 1500 to 3000 revolutions/minute, and/or the diameter of the spinner is between 200 and 800 mm, preferably 400 mm and/or wherein the mineral wool fibers are received on the receiving belt in the form of rovings having a length of between 10 and 50 cm.

According to another distinctive feature, the run speed of the receiving belt is between 30 m/min and 50 m/min and wherein the width of the receiving belt is between 700 mm and 1800 mm.

The invention also relates to a process for manufacturing a lining described above, comprising the process for manufacturing a thermal and/or sound insulation product, also described above, followed by a step of thermocompression, simultaneously carrying out (i) a process for heating said product to a temperature sufficient to soften or polymerize the binder within said product and (ii) a process for deforming said product which thus conforms to the desired shape of the lining.

The invention also relates to the use of a lining described above as thermal and/or sound insulation in a vehicle, in particular for thermal and/or sound insulation of an engine or of a vehicle passenger compartment, on a ceiling, a wall or a partition, under a roof or else in a household electrical appliance.

The term "lining" is understood, for the purposes of the invention, to mean any finished article, ready to be used or sold and resulting from the conversion of the insulation product according to the invention. It may be a panel, a partition, a door panel, a roof liner, a hood liner, a battery liner or an outer instrument panel, amongst others. It may also be a liner of a household electrical appliance such as for example a washing machine or dishwasher liner.

The term "roving" is understood, for the purposes of the invention, to mean a group of several hundreds of mineral fibers.

The term "ply" or "felt" is understood, for the purposes of the invention, to mean the arrangement of several rovings as defined previously and comprising, optionally, a web that is resistant any air flow, on and/or under which said rovings lie. Reference can then made to a surfaced ply or felt.

The "thermal conductivity" characterizes, for the purposes of the invention, the behaviour of the materials during heat transfer by conduction and represents the energy (amount of heat) transferred per unit of surface area and of time under a temperature gradient of 1 kelvin per meter. It is denoted by $\lambda$ (or k). It is measured according to the ISO 8301 standard at 10° C.

The term "basis weight" is understood, for the purposes of the invention, to mean a quantity characterizing the surface density, that is to say the mass per unit of surface area of said mineral wool. The units are typically grams per square meter ($g/m^2$). A layer of mineral wool is proportionally more flexible when its basis weight is low and proportionally stronger when its basis weight is high. The basis weight is defined from the EN 822 standards.

The "air flow resistivity", the units of which are $N \cdot s/m^4$, characterizes, for the purposes of the invention, the resistance of a given product or medium to the flow of air. This resistance is intrinsic to said product or medium. Regarding its measurement, a person skilled in the art uses a well known procedure according to the ISO 9053 standard.

The "sound absorption" is measured, for the purposes of the invention, using the sound absorption coefficient alpha ($\alpha$), having a value between 0 and 1.00. Zero represents the absence of absorption (total reflection) and 1.00 represents the total absorption of the sound.

Depending on the case, use is made, for the measurement of the sound absorption coefficient, of an alpha cabin or alpha sabin, according to the standard of the DA 49 1997 manufacturer of the diffuse-field measurement apparatus. The alpha cabin diffuse-field absorption is customarily used by the motor vehicle industry.

The term "mean" signifies "arithmetic mean".

Other features, details and advantages of the invention will become more clearly apparent on reading the description that follows, given by way of illustration but implying no limitation, with reference to the appended drawings in which:

FIG. 1 represents a graph of the absorption coefficient as a function of the frequency in Hz, measured according to the D 49 1977 manufacturer procedure, for a glass felt according to the invention having a basis weight of 300 $g/m^2$, and a glass felt according to the prior art having a basis weight of 425 $g/m^2$. The felts both have a thickness of 30 mm.

The products based on mineral wool, in particular on glass wool, are obtained by a known internal centrifugation process combined with attenuation by a high-temperature gas stream. On their journey, between the centrifugation device and the fiber collection belt, an aqueous binding compound, also referred to as binder, is vaporized on the still hot fibers, which binding compound then undergoes, during the conversion of the product into lining, a thermosetting reaction at temperatures of around 200° C.

Thus, the manufacture of insulation products based on mineral wool generally comprises a step of manufacturing glass fibers via a centrifugation process.

The process for forming mineral fibers consists in introducing a molten glass stream, via a basket pierced at the periphery, into a spinner, rotating at high speed and having a fiberizing spinner, pierced around its periphery by a very large number of orifices through which the glass is ejected in the form of filaments under the effect of the centrifugal force.

These filaments are then subjected to the action of an annular high-velocity-temperature attenuating stream, produced by a burner, and which hugs the wall of the spinner. Said stream thus attenuates the filaments and converts them into fibers.

The fiber output per orifice is adapted to the diameter of the fiberizing spinner, the spinner possibly having a diameter between 200 and 800 mm, preferably of 400 mm.

The total output of the molten material arriving in the spinner(s) is less than 26 tonnes/day and greater than 15 tonnes/day. It is preferably between 18 and 24 tonnes/day.

As regards the rotational speed of the spinner, it is between 1500 and 3000 revolutions/min, advantageously greater than or equal to 2000 revolutions/minute.

This process for converting glass into fibers requires a certain number of variable parameters to be balanced. In particular, the pressure and the temperature of the burner, and also the velocity of the attenuating gas, play an important role in the optimization of the fiber refining.

Thus, the pressure of the burner is between 250 and 750 mm WC, preferably between 280 and 440 mm WC, which makes it possible to reduce the turbulences. When the pressure of the burner is between 280 and 440 mm WC, the space between the spinner(s) and the mineral fiber receiving belt is less charged with gas. This makes it possible to reduce the suction under the receiving belt, and thus to have a thicker layer of mineral fibers, in particular of at least 10 mm, or greater than or equal to 15 mm, or even greater than or equal to 25 mm. Thus, the lining obtained by thermo-compression of this layer of mineral fibers has a satisfactory thickness for enabling good sound absorption.

The temperature of the burner, between 1350° C. and 1500° C., is advantageously 1450° C.

The daily fiber output per orifice of the spinner(s) is at most 1 kg, preferably at most 0.8 kg and at least 0.5 kg.

The fibers formed, naturally grouped together in the form of rovings consisting of a set of fibers, are entrained by this attenuating gas stream to a receiving device or receiving belt, which is moving and is generally formed by a gas-permeable belt combined with suction means.

At the same time, binder is sprayed onto the fibers while they fall toward the receiving device. Thus, the fibers are chemically bound by the application of at least one uncured binder, of thermosetting type, projected onto said fibers leaving the fiberizing spinner and which coats said fibers.

At this stage, the fibers, freshly sized or coated with binder, are deposited or projected onto the moving belt or receiving device, thus forming a ply. The run speed of the belt for receiving the fibers, combined in the form of rovings, is between 30 and 50 m/min.

The accumulation of fibers on the receiving device under the effect of the suction provides a fiber ply, the thickness of which may vary depending on the targeted final basis weight of the product to be manufactured.

Moreover, during the manufacturing process, the mineral wool fibers may be received on the receiving belt over a width of from 700 mm to 1800 mm, preferably between 850 mm and 1500 mm.

Advantageously, the mineral wool fibers are received on the receiving belt in the form of rovings having a length of between 10 and 50 cm, and more particularly of from 15 to 20 cm. This size of rovings is advantageous for obtaining a good distribution of said rovings in terms of basis weight both in the length and in the width of said product.

The process enables a good distribution of the fibers in the width of the insulation product, namely the width of the moving receiving belt.

Moreover, an essential parameter of the invention is the product P of the speed of the receiving belt and the width of said belt. This product P is between 38 and 90 m$^2$/min, preferably between 40 and 60 m$^2$/min, or between 40 and 50 m$^2$/min. It represents the equivalent of a surface flow rate. This quantity is essential for the definition of the basis weight characteristics of the product.

According to one embodiment, a woven or nonwoven web may be used before the fibers are received: it is then positioned on the moving belt upstream of receiving the rovings on said belt. The rovings of fibers are therefore, at the outlet of the fiberizing spinner, laid on said web. A ply is then available, laid on the conveyor, having, from the bottom to the top, a web and a layer of mineral fiber rovings.

Finally, it can be envisaged to position a second web during the conveying, this second web "sandwiching" the mineral fibers with the first web described above. The ply, laid on the conveyor, is then composed, from the bottom to the top, of a first web, in a lower position, of a layer of mineral fiber ravings and of a second web in an upper position.

At the outlet of the receiving device, a ply is obtained having a thickness of greater than 10 mm, advantageously ranging from 15 to 50 mm, and more generally ranging from 20 to 30 mm with a surface density ranging from 200 to 350 g/m$^2$.

The ply may then be cut widthways or lengthways, rolled up and stored. When it is used, it may be unrolled, cut, moved, handled, positioned and/or deformed in the mold in the most satisfactory manner.

It is recalled that the fineness of the fibers is determined by the value of their micronaire. The measurement of the micronaire, also referred to as the "fineness index", gives a picture of the specific surface area by means of the measurement of the aerodynamic pressure loss when a given quantity of fibers extracted from an unsized batt is subjected to a given pressure of a gas, in general air or nitrogen. This measurement is standard practice in mineral fiber production units, and is carried out according to the DIN 53941 or ASTM D 1448 standard and uses what is called a "micronaire apparatus". This apparatus gives a value "under 5 g". The micronaire is influenced by the mean diameter of the fibers. A low micronaire generally corresponds to fibers having a small mean diameter. At equivalent density, the reduction in the micronaire leads to an increase in the air flow resistivity.

However, such an apparatus has a measurement limit as regards a certain fineness of the fibers. For very fine fibers, a fineness ("the micronaire") may be measured in l/min by means of a known technique described in patent application WO 2003/098209. This patent application specifically relates to a device for determining the fineness index of fibers which comprises a device for measuring the fineness index, said fineness index measurement device being provided, on the one hand, with at least a first orifice connected to a measurement cell suitable for receiving a sample consisting of a plurality of fibers and, on the other hand, with a second orifice connected to a device for measuring a differential pressure occurring on either side of said sample, said differential pressure measurement device being intended to be connected to a fluid flow production device, characterized in that the fineness index measurement device comprises at least one volumetric flow meter for measuring the fluid passing through said cell. This device gives correspondences between "micronaire" values under 5 g and "micronaire" values in liters per minute (l/min).

By way of indication, a correspondence relationship between the micronaire values and the value of the mean diameter of the sample of fibers may be noted according to this document WO 2003/098209. Overall, a micronaire value of around 12 l/min corresponds to a mean diameter of around 2.5 to 3 micrometers, a value of around 13.5 l/min corresponds substantially to a mean diameter of 3 to 3.5 micrometers, and finally a value of around 18 l/min corresponds to around a mean diameter of around 4 to 5 micrometers.

The insulation product according to the invention, which may be obtained by the process described above, may combine a certain number of features, namely:
the surface density of the mineral wool layer may be preferably less than or equal to 300 g/m², or less than or equal to 250 g/m², and, optionally, greater than or equal to 200 g/m²; and/or
the micronaire of the mineral wool layer may be preferably at most 15 l/min, better still at most 12 l/min, and at least 9 l/min.

The product according to the invention based on mineral wool, advantageously glass wool, and which forms the ply described above, comprises, in addition, at least one binder, which may be chosen advantageously from thermosetting binders.

A thermosetting binder involves an irreversible polymerization which leads to a solid, generally rigid, finished product. It is prepared by crosslinking a resin and a crosslinking agent, which react under the action of heat in the presence of reactants, namely catalyst and polymerization accelerator.

Mention may be made, as thermosetting binders, of binders based (i) on phenol-formaldehyde resin, (ii) on polyepoxides, or (iii) on carbohydrates.

The phenol-formaldehyde resins are preferably chosen from resins having low contents of free formaldehyde, especially those described in applications WO-2008/043960 and WO-2008/043961. Mention may thus, for example, be made of the liquid resins essentially formed of phenol-formaldehyde and phenol-formaldehyde-amine condensates with a free formaldehyde content of less than or equal to 0.1% for application WO-2008/043960 and with a free formaldehyde content of less than or equal to 0.3% and a free phenol content of less than or equal to 0.5% for application WO-2008/043961, the contents being expressed by total weight of liquid.

The term "carbohydrates" is understood within the present application to mean products derived from renewable sources. They encompass, in the present application, not only carbohydrates in the strict sense, that is to say reducing sugars or hydrates of carbon of formulae $C_n(H_2O)_p$ having at least one aldehyde or ketone group (reducing group), but also the hydrogenation products of these hydrates of carbon where the aldehyde or ketone group has been reduced. Mention may thus be made of reducing sugars, non-reducing sugars, sugar alcohols or else hydrogenated sugars that encompass all of the products resulting from the reduction of a saccharide chosen from monosaccharides, disaccharides, oligosaccharides and polysaccharides and mixtures of these products.

Polyepoxides, also referred to as epoxide polymers or improperly "epoxy" polymers, are manufactured by polymerization of epoxide monomers with a curing agent which is a crosslinking agent which may be based on acid anhydride, on phenol or most often on amine (polyamine, aminoamide). Epoxy (or epoxide) resins cure irreversibly in the presence of a curing agent, under the effect of heat.

The content of binder in the product according to the invention may range from 8% to 14% by weight, preferably from 9% to 13% by weight, relative to the total weight of the mineral wool and binder.

The mineral wool fibers are advantageously laid on a woven or nonwoven web, which may be hydrophobic and/or oleophobic. The web may also have been pretreated in order to have, in addition, flame retardant and/or fungicidal properties following a compound fixed to said web by impregnation, coating or heat setting. Mention may for example be made, as a particularly advantageous web, in accordance with the invention, of a polyester-based woven web or a needle-punched nonwoven web based (i) on polyester and/or viscose fibers, (ii) on polypropylene fibers, or (iii) on carbon fibers, or a polyester-reinforced glass web.

The product according to the invention may thus be in the form of a ply having a thickness of greater than or equal to 10 mm, or greater than or equal to 15 mm, or even greater than or equal to 25 mm and/or having a thickness recovery of greater than or equal to 10 mm, or greater than or equal to 15 mm, or even greater than or equal to 25 mm following packaging in a roll for at least 6 weeks.

The plies may then be used to produce composite products by molding, such as linings. The formation of the linings is carried out by thermocompression molding. The thermocompression molding makes it possible to obtain parts by deformation and distribution of the material between a die and a punch (mold and countermold) mounted on a vertical press.

This process is based on the principle of the mold and countermold. The molding materials are positioned on the lower portion of the mold. The movable upper portion of said mold compresses these materials in order to fill the cavity and form the part. The closure time is dependent on the time needed for the binder to act, in particular the time needed for its polymerization.

The thermocompression process therefore successively comprises, in order:
a step of depositing the product or ply to be molded on the mold,
a step of closing the press with assembly of the mold and opposite countermold, said product or said ply being sandwiched between the latter,
a step of pressurizing the mold and countermold and heating them to a temperature, appropriate for the binder chosen and that may extend in one place from 180 to 230° C., limits included, in order to polymerize the binder,
a step of opening the mold and of removing from the mold the molded product or ply thus obtained,
a step of trimming to the exact dimensions or of deflashing in the case of use of a preform in order to obtain a lining according to the invention.

It can be envisaged, prior to the thermocompression process, either (i) to remove a web from the ply when the latter possesses at least one thereof, or (ii) to add at least one web to the ply. The web may be an aluminum film or any other woven or nonwoven web chosen as a function of the targeted lining or of the targeted application.

It can also be envisaged to position at least two plies, according to the invention, which are identical or different. They are then positioned one on the other in the mold in the deposition step.

Advantageously, the step of depositing the product, which is advantageously a surfaced ply, that is to say a ply comprising at least one woven or nonwoven web, is accompanied by a positioning of said product opposite the walls of a mold, namely the outer walls of said mold in the case of a male mold or inner walls of said mold in the case of a female mold.

Moreover, the process may comprise a step of evacuating the air located between said product or ply and the mold, this step following on from said positioning step, said evacuation of air taking place either (i) by spraying pressurized air on said product, expelling the air located between said product and the mold or (ii) by suction of said air or (iii) by applying a compressive mechanical force on said product, the process finishing with a step of removal from the mold with recovery of said lining.

The thermal treatment during the heating step that consists in heating the mold and therefore the product or ply makes it possible to bring about the polymerization of the thermosetting binder. Specifically, the binder is formed by crosslinking: two ingredients, one of which is typically a "resin", react under the action of the heat in the presence of reactants such as catalyst and polymerization accelerator. The three-dimensional structure formed is stable, and has thermomechanical and chemical resistance. Finally, after cooling of the product treated by the thermocompression molding process, solid bridges are created by means of the binder between the fibers. The lining resulting from the molded ply thus has a good cohesion and is rendered easy to handle.

The lining according to the invention is manufactured from a thermal and/or sound insulation product as defined above. This lining results from a molding of said insulation product. A lining is thus molded in an optionally non-planar shape that conforms to the contours of the support surface on which it is intended to be mounted.

Advantageously, the lining according to the invention may have, in addition, (i) a thermal conductivity of less than or equal to 42 mW/(m·K), preferably less than or equal to 40 mW/(m·K), and/or (ii) may have:

- an air flow resistivity of greater than or equal to 28 000 N·s/m$^4$ when said mineral wool layer has a thickness of greater than or equal to 10 mm, or
- an air flow resistivity of greater than or equal to 13 500 N·s/m$^4$ when said mineral wool layer has a thickness of greater than or equal to 15 mm, or
- an air flow resistivity of greater than or equal to 8000 N·s/m$^4$ when said mineral wool layer has a thickness of greater than or equal to 25 mm.

The lining may also have a sound absorption of greater than or equal to 0.8 between 1300 and 9000 Hz, advantageously between 1800 and 9000 Hz, measured according to the DA 49 1997 standard.

The linings according to the invention may be intended to be used in a vehicle, on a ceiling, under a roof or on a wall or a partition, or else in a household electrical appliance such as a washing machine or a dishwasher.

When they are used in a vehicle, they may thus thermally and/or acoustically insulate the engine of said vehicle and/or the driver's cab of this vehicle. The vehicle is chosen from an automobile, a bus, a truck, an agricultural vehicle, a boat, an aircraft and a train. Advantageously, it is an automobile.

The invention has the advantage of not requiring the use of several combinations of materials such as foams, cotton plies, etc. Specifically, only one suitable ply, that resists air flow, is sufficient. The processing time is therefore reduced, which leads to gains in productivity.

This ply could, in addition, also have other functions, optionally cumulative functions such as a hydrophobic and/or oleophobic function, and could also have an attractive appearance.

Furthermore, by lowering the basis weight, the amount of resin to be cured also drops, and therefore, indirectly, the molding/curing cycle time is also reduced thereby, enabling, here too, a significant gain in productivity.

An example of a product of the invention obtained in accordance with the process of the invention is presented below.

EXAMPLE 1: MANUFACTURE OF A GLASS WOOL PLY ACCORDING TO THE INVENTION

A glass wool ply is obtained from two fiberizing spinners, positioned in series, said fiberizing spinners each having a diameter of 300 mm and 13 150 holes, and with a manufacturing process that has the following characteristics:

The glass output is 10 tonnes/day and the output per spinner hole is 0.76 kg/day.

The rotational speed of the spinner is 2500 rpm.
The pressure of the burner is 290 mm WC.
The temperature of the burner is 1450° C.
The width of the receiving belt is 1250 mm.
The speed of the receiving belt is 39 m/min.
The product P is equal to 48.75 m$^2$/min.

The binder used is a phenol-formaldehyde resin at a content of 10% by weight relative to the total fibers+binder weight.

The thickness of the ply obtained is around 30 mm. The mean length of the rovings is around 200 mm.

The uncured product, according to the invention, obtained here, has the following characteristics:

The basis weight is 300 g/m$^2$. To measure the basis weight, a 300 mm×1000 mm test specimen of said product is taken according to the EN822 standard, cut in the lengthwise direction of the sized glass fiber batt. The surface area in m$^2$ of said test specimen is calculated, namely 0.3 m$^2$. The weight in grams of this test specimen is then measured. Next the basis weight in g/m$^2$ is calculated by dividing the measured weight in grams by the calculated surface area in m$^2$.

The micronaire or fineness index of the fibers is 2.9/5 g, measured according to the DIN 53941 standard.

The ply, thus obtained, then undergoes a curing process that consists in compressing said ply between two plates heated at 210° C. for 90 seconds.

The lining, according to the invention, obtained here, has the following characteristics:

The thermal conductivity is 40 mW/m·K, measured at 10° C. according to the ISO 8301 standard.

The air flow resistivity is 8000 N·s·m$^{-4}$, measured according to the EN29053 (ISO9053) standard.

The sound absorption coefficient is 0.94 at 3150 Hz, measured according to the DA 49 1997 standard.

This product can be compared with a glass wool ply obtained in a standard manner not in accordance with the invention.

COMPARATIVE 1: MANUFACTURE OF A GLASS WOOL PLY NOT IN ACCORDANCE WITH THE INVENTION

A glass wool ply is obtained from two fiberizing spinners, positioned in series, said fiberizing spinners each having a diameter of 300 mm and 13 150 holes, and with a manufacturing process that has the following characteristics:

The glass output is 11.5 tonnes/day and the output per spinner hole is 0.87 kg/day.

The rotational speed of the spinner is 2500 rpm.
The pressure of the burner is 330 mm WC.
The temperature of the burner is 1430° C.
The width of the receiving belt is 1000 mm.
The speed of the receiving belt is 35 m/min.
The product P is equal to 35 m$^2$/min.

The binder used is a phenol-formaldehyde resin at a content of 10% by weight relative to the total fibers+binder weight.

The thickness of the ply obtained is around 30 mm. The mean length of the rovings is around 350 mm.

The uncured product, not in accordance with the invention, obtained here, has the following characteristics:

The basis weight is 425 g/m$^2$. The measurement was made according to the method described in the preceding example 1.

The micronaire or fineness index of the fibers is 3.3/5 g, measured according to the DIN 53941 standard.

The ply, thus obtained, then undergoes a curing process that consists in compressing said ply between two plates heated at 210° C. for 90 seconds.

The lining, not in accordance with the invention, obtained here, has the following characteristics:

The thermal conductivity is 38 mW/m·K, measured at 10° C. according to the ISO 8301 standard.

The air flow resistivity is 5000 N·s·m$^{-4}$ measured according to the EN29053 (ISO9053) standard.

The sound absorption coefficient is 0.96 at 3150 Hz, measured according to the DA 49 1997 standard.

The fiberizing process according to the invention thus made it possible, in a non-obvious manner, to provide a thermal and sound insulation product that until then did not exist, owing to several technical characteristics relating for the most part to the rotational speed of the fiberizing spinner, to the temperature and the pressure of the burner, to the fiber output and to the speed of the receiving belt.

The product, according to the invention, has an acoustic impedance that is comparable to the products on the market and also a thermal conductivity that is not degraded much despite a great reduction in the basis weight, making it possible to attain a high level of thermal resistance and a virtually identical acoustic impedance with a significantly reduced ply thickness.

Finally, the product according to the invention, due to its relatively low basis weight, is in the form of thin, flexible and lightweight sheets that can be stored in the form of rolls. These sheets then make it possible to produce rigid linings, molded by thermocompression, and of various shapes.

And, as can be seen in view of the comparative example, the Applicant has succeeded in reducing the basis weight of an insulation product, the latter therefore being less heavy, while degrading very little the thermal insulation properties and by retaining the sound insulation properties of said product.

The invention claimed is:

1. An uncured thermal and/or sound insulation product, based on mineral wool, comprising a cut mineral wool ply sized by at least one uncured binder, said cut mineral wool ply sized by the at least one uncured binder having:
    a surface density, or basis weight, of less than or equal to 350 g/m$^2$, measured according to the EN 822 standard,
    a micronaire of at most 3 under 5 grams, and
    a final thickness equal to or greater than 15 mm.

2. The product of claim 1, comprising between 8% and 14% by weight of binder, relative to the total weight of the mineral wool and binder, and is chosen from thermosetting binders.

3. The product of claim 2, wherein the binder is chosen from thermosetting binders based (i) on phenol-formaldehyde resin, (ii) on polyepoxides, or (iii) on carbohydrates.

4. The product of claim 1, wherein the mineral wool fibers are laid on a hydrophobic and/or oleophobic, woven or nonwoven web.

5. The product of claim 4, wherein the web has, in addition, flame retardant and/or fungicidal properties owing to a compound fixed to said web by impregnation, coating or heat setting.

6. The product of claim 4, wherein the web is a polyester-based woven web or a needle-punched nonwoven web based (i) on polyester and/or viscose fibers, (ii) on polypropylene fibers, or (iii) on carbon fibers, or a polyester-reinforced glass web.

7. A lining obtained from the product of claim 1 by molding into a shape at a polymerization temperature of the binder, the lining conforming to contours of a support surface on which the lining is mounted.

8. The lining of claim 7, having a thermal conductivity of less than or equal to 42 mW/(m·K), measured according to the ISO 8301 standard at 10° C., and/or having:
    an air flow resistivity of greater than or equal to 28 000 N·s/m$^4$, measured according to the ISO 9053 standard, when said mineral wool ply has a thickness of greater than or equal to 10 mm, or
    an air flow resistivity of greater than or equal to 13 500 N·s/m$^4$, measured according to the ISO 9053 standard, when said mineral wool ply has a thickness of greater than or equal to 15 mm, or
    an air flow resistivity of greater than or equal to 8000 N·s/m$^4$, measured according to the ISO 9053 standard, when said mineral wool ply has a thickness of greater than or equal to 25 mm.

9. The lining of claim 7, having a sound absorption of greater than or equal to 0.8 between 1300 and 9000 Hz, measured according to the DA 49 1997 standard.

10. A process for manufacturing the product of claim 1, with the aid of a facility comprising an internal centrifugation device that comprises at least one spinner capable of rotating about an axis X, and the peripheral band of which is pierced by a plurality of orifices for delivering filaments of a molten material, a high-temperature gas attenuating means in the form of an annular burner that attenuates the filaments into fibers, and a receiving belt associated with suction means for receiving the fibers, consisting in regulating a combination of parameters which are at least:
    the pressure of the burner, which is between 250 and 750 mm WC,
    the temperature of the burner, which is between 1350° C. to 1450° C.,
    the daily fiber output per spinner orifice, which is at most 1 kg, the total output being at most 26 tons/day, and
    the product (P) of the run speed of the receiving belt and the width of said belt, which is between 38 and 90 m$^2$/min.

11. The process of claim 10, wherein the rotational speed of the spinner is between 1500 to 3000 revolutions/minute, and/or
the diameter of the spinner is between 200 and 800 mm, and/or
wherein the mineral wool fibers are received on the receiving belt in the form of rovings having a length of between 10 and 50 cm.

12. The process of claim 10, wherein the run speed of the receiving belt is between 30 m/min and 50 m/min and wherein the width of the receiving belt is between 700 mm and 1800 mm.

13. A process for manufacturing the lining of claim 7, comprising:
manufacturing a thermal and/or sound insulation product with the aid of a facility comprising an internal centrifugation device that comprises at least one spinner capable of rotating about an axis X, and the peripheral band of which is pierced by a plurality of orifices for delivering filaments of a molten material, a high-temperature gas attenuating means in the form of an annular burner that attenuates the filaments into fibers, and a receiving belt associated with suction means for receiving the fibers, consisting in regulating a combination of parameters which are at least:

the pressure of the burner, which is between 250 and 750 mm WC, the temperature of the burner, which is between 1350° C. to 1450° C., the daily fiber output per spinner orifice, which is at most 1 kg, the total output being at most 26 tons/day, and the product (P) of the run speed of the receiving belt and the width of said belt, which is between 38 and 90 m²/min, followed by a step of thermocompression, simultaneously carrying out (i) a process for heating said product to a temperature sufficient to soften or polymerize the binder within said product and (ii) a process for deforming said product which thus conforms to the desired shape of the lining.

14. The lining of claim 7, wherein the lining is thermal and/or sound insulation in a vehicle, on a ceiling, a wall or a partition, under a roof or in a household electrical appliance.

15. The product of claim 1, wherein the mineral wool is a glass wool.

16. The product of claim 1, wherein the surface density is less than or equal to 250 g/m².

17. The product of claim 1, wherein the surface density is greater than or equal to 200 g/m².

18. The product of claim 1, wherein the micronaire is at most 12 L/min.

19. The product of claim 1, wherein the micronaire is at least 9 L/min.

20. The product of claim 1, wherein the final thickness is greater than or equal to 25 mm.

21. The product of claim 1, wherein said product has a thickness recovery of greater than or equal to 10 mm following packaging in a roll for at least 6 weeks.

22. The product of claim 1, wherein the mineral wool of said cut mineral wool ply consists of mineral wool fibers solely coated with said at least one uncured binder, the at least one uncured binder consisting of a resin and a reactant with said resin.

* * * * *